(12) United States Patent
Kondo et al.

(10) Patent No.: US 10,505,215 B2
(45) Date of Patent: Dec. 10, 2019

(54) METHOD OF MANUFACTURING NON-AQUEOUS ELECTROLYTE SECONDARY BATTERY AND NON-AQUEOUS ELECTROLYTE SECONDARY BATTERY

(71) Applicants: Hiroki Kondo, Nisshin (JP); Hideki Sano, Ikeda (JP)

(72) Inventors: Hiroki Kondo, Nisshin (JP); Hideki Sano, Ikeda (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 196 days.

(21) Appl. No.: 14/417,949

(22) PCT Filed: Jul. 31, 2013

(86) PCT No.: PCT/IB2013/001671
§ 371 (c)(1),
(2) Date: Jan. 28, 2015

(87) PCT Pub. No.: WO2014/024019
PCT Pub. Date: Feb. 13, 2014

(65) Prior Publication Data
US 2015/0263376 A1   Sep. 17, 2015

(30) Foreign Application Priority Data
Aug. 8, 2012  (JP) .................... 2012-176347

(51) Int. Cl.
*H01M 2/04* (2006.01)
*H01M 2/08* (2006.01)
(Continued)

(52) U.S. Cl.
CPC ......... *H01M 10/0431* (2013.01); *H01M 2/02* (2013.01); *H01M 2/0202* (2013.01);
(Continued)

(58) Field of Classification Search
None
See application file for complete search history.

(56) References Cited

U.S. PATENT DOCUMENTS 6,348,282 B1    2/2002  Okochi et al.
2003/0180605 A1*  9/2003  Mizutani .............. H01M 2/021
                                                              429/94
(Continued)

FOREIGN PATENT DOCUMENTS

CN   102054958 A     5/2011
EP   2 325 925 A1    5/2011
(Continued)

OTHER PUBLICATIONS

English translation of JP2003297432 (2003).*

*Primary Examiner* — Yoshitoshi Takeuchi
(74) *Attorney, Agent, or Firm* — Sughrue Mion, PLLC

(57) ABSTRACT

There is provided a method of manufacturing a non-aqueous electrolyte secondary battery equipped with a wound electrode body that is formed by laminating and winding a positive electrode, a negative electrode, and a separator. This method includes preparing the wound electrode body including an uncoated portion of positive electrode active material layers and an uncoated portion of negative electrode active material layers, and not forming the positive electrode active material layers on at least a surface of a positive electrode current collector on a winding outer peripheral side thereof in a region that includes at least an outermost periphery of the positive electrode; structuring the secondary battery by accommodating the wound electrode body in a battery case; and subjecting the secondary battery to an aging treatment in which the secondary battery is retained within a temperature range that is equal to or higher than 60° C.

11 Claims, 4 Drawing Sheets

(51) Int. Cl.
- *H01M 2/36* (2006.01)
- *H01M 10/02* (2006.01)
- *H01M 10/04* (2006.01)
- *H01M 10/42* (2006.01)
- *H01M 10/52* (2006.01)
- *H01M 10/0587* (2010.01)
- *H01M 2/02* (2006.01)
- *H01M 10/052* (2010.01)

(52) U.S. Cl.
CPC ....... *H01M 2/0237* (2013.01); *H01M 10/049* (2013.01); *H01M 10/052* (2013.01); *H01M 10/0587* (2013.01); *H01M 10/4235* (2013.01); *H01M 2220/20* (2013.01); *H01M 2220/30* (2013.01); *Y10T 29/49112* (2015.01)

(56) References Cited

U.S. PATENT DOCUMENTS

| | | |
|---|---|---|
| 2003/0215700 A1 | 11/2003 | Hosoda et al. |
| 2005/0130035 A1 | 6/2005 | Inada et al. |
| 2011/0039140 A1 | 2/2011 | Miyahisa et al. |
| 2011/0104561 A1* | 5/2011 | Kim .................... H01M 2/1673 429/181 |
| 2012/0141869 A1* | 6/2012 | Takahata ............. H01M 10/052 429/188 |
| 2013/0071710 A1 | 3/2013 | Saito et al. |
| 2013/0316242 A1 | 11/2013 | Matsuno et al. |

FOREIGN PATENT DOCUMENTS

| | | | |
|---|---|---|---|
| EP | 2 328 211 A1 | 6/2011 | |
| JP | 11-176478 A | 7/1999 | |
| JP | 2000-048852 A | 2/2000 | |
| JP | 2003-051339 A | 2/2003 | |
| JP | 2003-297432 A | 10/2003 | |
| JP | 2003297432 * | 10/2003 | ............ H01M 10/40 |
| JP | 3489381 B2 | 11/2003 | |
| JP | 2010-153337 A | 7/2010 | |
| JP | WO 2011/024250 * | 3/2011 | ............ H01M 10/40 |
| JP | 2011-243527 A | 12/2011 | |
| WO | 2011/024250 A1 | 3/2011 | |
| WO | 2011/145205 A1 | 11/2011 | |
| WO | 2012/043810 A1 | 4/2012 | |
| WO | 2012/051402 A1 | 4/2012 | |

* cited by examiner

METHOD OF MANUFACTURING NON-AQUEOUS ELECTROLYTE SECONDARY BATTERY AND NON-AQUEOUS ELECTROLYTE SECONDARY BATTERY

BACKGROUND OF THE INVENTION

1. Field of the Invention

The invention relates to a method of manufacturing a non-aqueous electrolyte secondary battery. More specifically, the invention relates to a manufacturing method that is designed for a non-aqueous electrolyte secondary battery equipped with a wound electrode body and includes an aging treatment. Also, the invention relates to a non-aqueous electrolyte secondary battery.

2. Description of Related Art

Chargeable/dischargeable non-aqueous electrolyte secondary batteries such as nickel hydride batteries, lithium secondary batteries and the like have been increasing in importance as in-vehicle power supplies, power supplies of personal computers and mobile terminals, and the like. In particular, lithium secondary batteries that are light and make it possible to obtain high energy density have been preferably used as in-vehicle high-output power supplies.

As one form of such batteries, a tightly closed battery in which an electrode body that is obtained by laminating a positive electrode and a negative electrode on each other via a separator is accommodated in a battery case together with an electrolyte can be mentioned. Typically, after a wound electrode body that is obtained by winding a sheet-like electrode body is accommodated in the battery case, the battery case is fitted with a lid body to be sealed, whereby this tightly closed battery is structured. Then, the structured battery is subjected to a charge/discharge treatment (a conditioning treatment) on a predetermined condition in order to make an adjustment such that the structured battery can be actually employed. Besides, after the aforementioned conditioning treatment is performed, an aging treatment in which the battery is retained under a predetermined condition is performed for the purpose of obtaining various effects such as infiltrating a non-aqueous electrolytic solution into the wound electrode body, selecting a battery in which the drop in initial battery capacity that can be equivalent to a self-discharge amount (the initial deterioration) is large, and also stabilizing the battery performance, etc. This aging treatment depends on its purpose, but can be performed in a temperature range higher than a room temperature range (e.g., 30° C. to 60° C.), whereby the aforementioned retention time until a predetermined effect is obtained can be ended as a short time.

In the aging treatment at a relatively high temperature as in this case, it is known that problems can occur in that the internal resistance of the battery rises as an inhibitory substance is produced as a result of a charge/discharge reaction of the battery, or as an electrode active material swells etc., that the internal pressure of the battery is enhanced due to gas generated during aging so that the battery case is deformed, and the like. On the other hand, it is disclosed in, for example, Japanese Patent Application Publication No. 2010-153337 (JP-2010-153337 A) that the internal resistance of the battery and the internal pressure of the battery are restrained from rising by adjusting the concentration of oxygen gas in the battery during aging to 10 vol % to 20 vol %.

By the way, the aging treatment in manufacturing the secondary battery can also be performed for the purpose of dissolving/precipitating metal foreign matters that can be mixed into the battery in a manufacturing process. In the aging treatment that is performed for this purpose, it has been conventional to adjust the battery to a high state of charge (SOC) after the conditioning treatment, and hold the battery at a high temperature for a long time (e.g., for about 24 hours or more). In this aging treatment, the dissolution of metal foreign matters can further be promoted, the holding time until the achievement of a predetermined effect can further be reduced, and a reduction in the costs of manufacturing can be expected by holding the temperature at which the battery is held at a higher temperature, for example, within a temperature range equal to or higher than 60° C.

SUMMARY OF THE INVENTION

However, it has turned out that if the temperature of the aging treatment is set to a high temperature that is equal to or higher than 60° C. (e.g., a temperature that exceeds 60° C.), there is caused a new problem in that minor short-circuiting other than that which results from the aforementioned metal foreign matters is extremely highly likely to occur in the wound electrode body. The battery in which such minor short-circuiting has occurred has a large self-discharge amount, and hence is not preferred.

The inventors have repeatedly conducted detailed studies on the situation of the occurrence of minor short-circuiting that occurs when the secondary battery that is equipped with the wound electrode body is subjected to aging at a high temperature equal to or higher than 60° C. (hereinafter, "the high temperature" in the present specification will mean a temperature range that is equal to or higher than 60° C. unless otherwise noted). As a result, the inventors have found out that this minor short-circuiting occurs in a certain region of the wound electrode body. Then, the inventors have found out that the aging treatment can be performed within a high-temperature range equal to or higher than 60° C. without causing this minor short-circuiting, by creating a situation in which "the specific region" that can induce this minor short-circuiting does not come into direct contact with oxygen contained in a space in the battery case, and have come to complete the invention.

In a conventional battery, "the specific region" that can induce this minor short-circuiting is a positive electrode active material layer region that is in such an environment as to be likely to come into direct contact with oxygen contained in the space in the battery case. Then, minor short-circuiting frequently occurs during the high-temperature aging treatment between this positive electrode active material layer region and a negative electrode active material layer region that is opposed thereto. More specifically, the aforementioned specific region is typically that region of the positive electrode active material layer which is directly open to the space in the battery case at both ends of the wound electrode body.

The invention provides a non-aqueous electrolyte secondary battery that makes it possible to inhibit the occurrence of minor short-circuiting resulting from an aging treatment at a high temperature that is equal to or higher than 60° C., and a method of manufacturing the non-aqueous electrolyte secondary battery to manufacture the high-quality secondary battery in a short time.

A first aspect of the invention relates to a method of manufacturing a non-aqueous electrolyte secondary battery (hereinafter abbreviated simply as the secondary battery, the battery or the like in some cases) that is equipped with a wound electrode body that is formed by laminating a positive electrode, which has positive electrode active material layers provided on both faces of a positive electrode current collector thereof respectively, and a negative electrode, which has negative electrode active material layers provided on both faces of a negative electrode current collector thereof respectively, on each other via a separator, and winding a lamination of the positive electrode, the negative electrode, and the separator. Also, this manufacturing method includes preparing the wound electrode body in which (1) an uncoated portion where the aforementioned positive electrode active material layers are not formed is laminated in a state of protruding from the aforementioned negative electrode at one of both ends of the aforementioned wound electrode body in a direction of a winding axis thereof, (2) an uncoated portion where the aforementioned negative electrode active material layers are not formed is laminated in a state of protruding from the aforementioned positive electrode at the other of both the ends of the wound electrode body in the direction of the winding axis thereof, and (3) the positive electrode active material layers are not formed on at least a surface of the aforementioned positive electrode current collector on a winding outer peripheral side thereof in a region that includes at least an outermost periphery of the aforementioned positive electrode. This manufacturing method includes subsequently structuring the secondary battery by accommodating the aforementioned wound electrode body as well as a non-aqueous electrolyte in a battery case, and subjecting the aforementioned secondary battery to an aging treatment in which the secondary battery is held within a temperature range that is equal to or higher than 60° C.

In the wound electrode body, upper and lower faces of the positive electrode active material layers are generally sandwiched by the positive electrode current collector and the separator, and seldom come into direct contact with oxygen contained in the space in the battery case. Besides, according to the foregoing configurations (1) and (2), both ends of the positive electrode active material layers (which may include lateral faces and the vicinity thereof) except those regions of the positive electrode active material layers which are located at the outermost periphery of the wound electrode body (i.e., the positive electrode active material layers which are formed on the faces of the outermost peripheral positive electrode current collector on the winding outer peripheral side thereof) are isolated from the space in the battery case by the positive electrode uncoated portion and the negative electrode uncoated portion, and are restrained from coming into direct contact with oxygen contained in the space. On the other hand, in the case where the positive electrode active material layers are formed on the faces of the outermost peripheral positive electrode current collector on the winding outer peripheral side thereof, the positive electrode active material layers can be in a state of being directly open to the space in the battery case. This is because the uncoated portion of the positive electrode current collector does not exist on the winding outer peripheral side with respect to the ends of the positive electrode active material layers at which the uncoated portion is provided. Thus, owing to the foregoing configuration (3), the positive electrode active material layers are not provided on the surface of the positive electrode current collector on the winding outer peripheral side thereof, in the region that includes at least the outermost periphery of the positive electrode. In other words, there is adopted a configuration in which the positive electrode active material layers that exist on the outermost peripheral side are always located on the winding inner peripheral side with respect to the positive electrode current collector. As a result, this specific region is restrained from coming into direct contact with oxygen in the battery case. Thus, according to the foregoing aspect of the invention, the occurrence of minor short-circuiting can be suppressed in the case where the aging treatment is performed in the temperature range that is equal to or higher than 60° C.

In the foregoing aspect of the invention, the prepared wound electrode body may be configured such that the region that includes at least the outermost periphery of the aforementioned positive electrode is arranged on a winding outer peripheral side of a region that constitutes an outermost periphery of the aforementioned negative electrode.

According to the foregoing aspect of the invention, in the case where the positive electrode active material layers are formed on the face of the positive electrode current collector on the inner peripheral side thereof in the region that includes at least the outermost periphery of the positive electrode, the negative electrode active material layers are opposed to the positive electrode active material layers, and the area of the electrode body increases, so that the battery structure can be more rationally structured. Besides, in the case where the positive electrode active material layers are not formed on both the faces of the positive electrode current collector in the region that includes at least the outermost periphery of the positive electrode, only the positive electrode current collector is wound around the outermost periphery of the electrode body. It is possible to structure, for example, a firm battery structure that is resistant to an impact, a pressure and the like from the outside.

In the foregoing aspect of the invention, the prepared wound electrode body may be configured such that the aforementioned positive electrode active material layers are not formed on both faces of the positive electrode current collector in the region that includes at least the outermost periphery of the aforementioned positive electrode.

In the wound electrode body, out of both the electrode active material layers that are opposed to each other via the separators, that one which is located more on the outer peripheral side has a wider opposed area. On the other hand, in the secondary battery, the positive electrode may be opposed to the sufficiently wide negative electrode, if reception properties of charge carriers are taken into account. Accordingly, especially at the winding end of the wound electrode body, out of the positive and negative electrode active material layers that are opposed to each other, the negative electrode active material layers may be located more on the winding outer peripheral side. According to the foregoing aspect of the invention, at the winding end of the wound electrode body, the positive and negative electrode active material layers can be opposed to each other such that the negative electrode active material layers are located more on the winding outer peripheral side. Therefore, the non-aqueous electrolyte secondary battery in which short-circuiting resulting from precipitation of metal lithium is suppressed can be manufactured.

In the foregoing aspect of the invention, the aforementioned battery case may be equipped with a positive electrode current collector terminal plate that is electrically connected to the positive electrode of the aforementioned wound electrode body, and a negative electrode current collector terminal plate that is electrically connected to the negative electrode of the aforementioned wound electrode body. Structuring of the aforementioned secondary battery may include bundling the uncoated portion of the positive electrode of the aforementioned wound electrode body in at least a region of the aforementioned wound electrode body in a circumferential direction thereof, connecting the uncoated portion of the aforementioned positive electrode to the aforementioned positive electrode current collector terminal plate in the bundled region without the intervention of another member, bundling the uncoated portion of the negative electrode of the aforementioned wound electrode body in at least a region of the aforementioned wound electrode body in a circumferential direction thereof, and connecting the uncoated portion of the aforementioned negative electrode to the aforementioned negative electrode current collector terminal plate in the bundled region without the intervention of another member.

According to the foregoing aspect of the invention, the positive electrode active material layers can be more reliably restrained from coming into contact with oxygen gas components in the battery case, by bundling the uncoated portions that are formed on both the positive and negative electrodes. The manufacturing method can be suited for the winding electrode body that is equipped with these uncoated portions. Furthermore, in the foregoing aspect of the invention, when the electrode body is connected to the positive and negative electrode current collector terminal plates, the positive and negative electrode uncoated portions and the positive and negative electrode current collector terminal plates are directly connected to each other respectively without the intervention of, for example, another member such as a current collector foil, a tab or the like for connection. Thus, in addition to the aforementioned effect, a current can be taken out from the electrode body without increasing the internal resistance, so that a high-output battery can be manufactured.

In the foregoing aspect of the invention, each of the aforementioned positive electrode active material layers may include a lithium transition metal compound oxide including manganese, as a positive electrode active material.

In the aging treatment that is intended to dissolve metal foreign matters, it is necessary to set the potential of the positive electrode to a value that is higher than the oxidation/reduction potential of metal foreign matters. However, it has been confirmed that the potential of the positive electrode is still higher than the potential of other regions in the aforementioned specific region in which minor short-circuiting is likely to occur in the high-temperature aging treatment. In general, as the potential of the positive electrode rises, the stability of the positive electrode active material decreases, and the likelihood of a side reaction such as dissolution or the like increases. This unstable state is remarkably observed, for example, in the case where lithium transition metal compound oxides containing manganese (Mn) are used as the positive electrode active material. Mn is dissolved from the positive electrode active material into the electrolytic solution, and is locally deposited on the negative electrode that is opposed thereto, whereby minor short-circuiting occurs. On the other hand, according to the foregoing aspect of the invention, Mn can be restrained from being eluted in the aforementioned specific region in the high-temperature aging treatment as well. Accordingly, the foregoing aspect of the invention can be applied to the manufacture of a secondary battery in which lithium transition metal compound oxides including manganese are used as a positive electrode active material.

In the foregoing aspect of the invention, the method may further include subjecting the aforementioned structured secondary battery to a conditioning treatment. The aforementioned aging treatment may be performed for the secondary battery that has been subjected to the conditioning treatment.

According to the foregoing aspect of the invention, the high-temperature aging treatment is performed for the battery that has been subjected to the conditioning treatment. Therefore, for example, the aging treatment that is intended to dissolve metal foreign matters can be performed in a shorter time.

In the foregoing aspect of the invention, the aforementioned aging treatment may be performed after a battery voltage of the aforementioned secondary battery is adjusted to a voltage that is equal to or higher than 3.8 V.

According to the foregoing aspect of the invention, the voltage of the battery can be adjusted to a value that is equal to or higher than 3.8 V in performing the high-temperature aging treatment. Thus, for example, metal foreign matters with a relatively high oxidation/reduction potential, such as copper (Cu) or the like, can be dissolved.

A second aspect of the invention relates to a non-aqueous electrolyte secondary battery. The non-aqueous electrolyte secondary battery includes a positive electrode that has positive electrode active material layers provided on both faces of a positive electrode current collector thereof respectively, a negative electrode that has negative electrode active material layers provided on both faces of a negative electrode current collector thereof respectively, a separator, a wound electrode body that is formed by laminating the positive electrode and the negative electrode on each other via the separator and winding a lamination of the positive electrode, the negative electrode, and the separator, and a battery case in which the wound electrode body is accommodated together with a non-aqueous electrolyte. At one of both ends of the wound electrode body in a direction of a winding axis thereof, an uncoated portion where the positive electrode active material layers are not formed is laminated in a state of protruding from the negative electrode. At the other of both the ends of the wound electrode body in the direction of the winding axis thereof, an uncoated portion where the negative electrode active material layers are not formed is laminated in a state of protruding from the positive electrode. In a region that includes at least an outermost periphery of the positive electrode, the positive electrode active material layers are not formed at least on a surface of the positive electrode current collector on a winding outer peripheral side thereof.

As described above, according to the first and second aspects of the invention, the aging treatment intended to fuse metal foreign matters can be performed at a high temperature and in a short time, without causing minor short-circuiting. That is, the secondary battery that is equipped with the wound electrode body can be manufactured with high reliability and at low cost. This effect can be exerted more in the case where the invention is applied to a large battery that is especially required of high-output characteristics and high-capacity characteristics. For example, more specifically, the invention is applicable to the manufacture of a battery that is equipped with one or more of a characteristic (i) that the energy density is equal to or higher than 500 wh/L, a characteristic (ii) that the capacity is equal to or higher than 2.4 Ah, and a characteristic (iii) that the output density is equal to or higher than 1.5 kwh·L, or to the manufacture of a battery that is equipped with all the characteristics (i) to (iii). Thus, the non-aqueous electrolyte secondary battery (which can be a variant of an assembled battery) manufactured according to this manufacturing method can be employed as a driving power supply that is mounted on a vehicle such as a motor vehicle or the like. The type of the vehicle is not limited in particular, but typically, a hybrid vehicle, an electric vehicle, a fuel cell-powered vehicle or the like can be exemplified.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
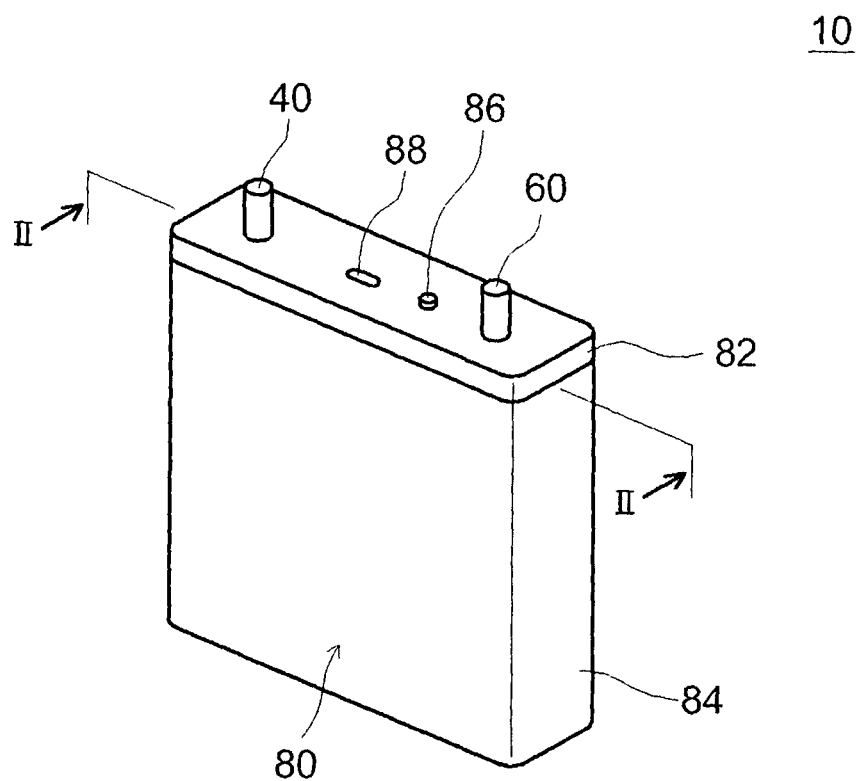
FIG. 1 is a perspective view schematically exemplifying the appearance of a non-aqueous electrolyte secondary battery according to the embodiment of the invention.

According to the studies conducted by the inventors as described above, the following knowledge has been obtained as to a situation of the occurrence of minor short-circuiting that frequently occurs in the case where a secondary battery that is equipped with a wound electrode body is subjected to an aging treatment at a high temperature that is equal to or higher than 60° C.

[Region of Minor Short-circuiting]

As described above, minor short-circuiting resulting from this high-temperature aging occurs at an end on the side where an uncoated portion of a positive electrode current collector is provided, between positive electrode active material layers and negative electrode active material layers on an outermost periphery of a wound electrode body. Then, especially in the case where the wound electrode body is flatly squashed, minor short-circuiting frequently occurs at a curved portion (a wound R portion) with a largest radius of curvature on a winding cross-section thereof. This minor short-circuiting occurs when metal components of the positive electrode active material are dissolved into an electrolytic solution, is locally precipitated onto the surface of a negative electrode that is opposed thereto, and finally reaches the positive electrode side. Accordingly, it is safe to assume that minor short-circuiting occurs due to elution of metal components from the vicinity of an end of the positive electrode active material on the side where the uncoated portion of the positive electrode current collector is provided in the direction of a winding axis (in a width direction of the positive electrode), out of the positive electrode active material layers that are located on a winding outer peripheral side of an outermost peripheral region of the positive electrode (the positive electrode active material layers that are formed on the positive electrode current collector on the winding outer peripheral side thereof) in the outermost peripheral region of the positive electrode.

[Cause]

According to the studies conducted by the inventors, it could be confirmed that this minor short-circuiting is ascribable to the following three elements. a) It could be confirmed that the potential on the positive electrode side is especially high for some reason in the aforementioned minor short-circuiting region. Dissolution of metal foreign matters in the aging treatment is carried out through the use of an electro-chemical reaction. Thus, dissolution is carried out with the battery adjusted to a high SOC. At this time, in anticipation of a voltage drop during the aging treatment, it is conventional to start the aging treatment by adjusting the voltage of the battery to a voltage that exceeds 3.8 V (e.g., 3.97 V). It should be noted herein that the potential of the positive electrode becomes equal to a potential that is still higher than the voltage of the battery (e.g., 4.06 V as an actually measured value) in this state. However, it has been confirmed that a potential that is far higher than the aforementioned potential of the positive electrode (e.g., equal to or higher than 4.3 V as an actually measured value) is reached immediately after a conditioning treatment, namely, immediately before the aging treatment in a region where the aforementioned minor short-circuiting occurs. In general, as the potential of the positive electrode increases, the stability of the positive electrode active material decreases, and the likelihood of a side reaction such as dissolution (elution) or the like increases. Accordingly, minor short-circuiting is considered to occur due to elution of metal components from the positive electrode active material resulting from this high potential of the positive electrode.

b) In an oxygen secondary battery, the space in the battery case is generally filled with dry air. According to the studies conducted by the inventors, it has been revealed that if the space in the battery case is filled with inactive gas, elution of metal components from the positive electrode active material or minor short-circuiting resulting therefrom does not occur in the high-temperature aging treatment either. That is, these phenomena occur in the case where there is air or dry air in the space in the battery case. Thus, the presence of oxygen in the space is estimated to be some cause of minor short-circuiting. Although not confirmed in detail, the inventors predict that oxygen present in the space in the battery case reacts with the electrolytic solution during the aging treatment to generate a corrosive substance (e.g., fluorinated acid or the like) etc., thereby inducing elution of metal components from the positive electrode active material or minor short-circuiting resulting therefrom. However, in suppressing this influence of oxygen, it is not preferable to encapsulate part of a manufacturing line with an inactive gas in an inactive gas atmosphere, from the standpoint of manufacturing costs and the safety of the manufacturing line. Accordingly, it is desirable to establish a manufacturing method that makes it possible to perform the high-temperature aging treatment even if, for example, encapsulation with dry air by the atmosphere or ambient air is adopted.

c) It has been confirmed that minor short-circuiting is prevented from occurring by setting the temperature of the high-temperature aging treatment to a relatively low temperature that is equal to or lower than 60° C. However, it is desirable to reduce the manufacturing costs by reducing the aging treatment time and hence the time for manufacturing the secondary battery.

Thus, in the embodiment of the invention disclosed herein, in the method of manufacturing the secondary battery that is equipped with the wound electrode body, with a view to solving the problems resulting from the aforementioned causes a) and b), the wound electrode body that is equipped with all the following characteristics (1) to (3) is prepared. Furthermore, the secondary battery that is equipped with this wound electrode body is subjected to the aging treatment at a high temperature that is equal to or higher than 60° C., which is also the aforementioned cause c). (1) At one of both the ends of the aforementioned wound electrode body in the direction of the winding axis thereof, the uncoated portion in which the aforementioned positive electrode active material layers are not formed is laminated in a state of protruding from the aforementioned negative electrode. (2) At the other of the aforementioned both ends, the uncoated portion in which the aforementioned negative electrode active material layers are not formed is laminated in a state of protruding from the aforementioned positive electrode. (3) In the region that includes at least the outermost periphery of the aforementioned positive electrode, the positive electrode active material layers are not formed on the surface of the aforementioned positive electrode current collector at least on the winding outer peripheral side thereof.

The method of manufacturing the non-aqueous secondary battery disclosed herein will be described hereinafter with reference to the drawings, citing an example of a method of manufacturing a lithium-ion battery as an embodiment of the invention. Incidentally, matters that are needed for implementation and are other than those mentioned in particular in the present specification can be grasped as a technical common sense in the relevant field. The invention can be implemented on the basis of the contents disclosed in the present specification and the technical common sense in the relevant field. Besides, in the present specification, "the secondary battery" generally means a battery that can be repeatedly charged/discharged through the movement of charge carriers, and typically encompasses nickel hydride batteries, lithium secondary batteries, lithium polymer batteries, and the like. Besides, in the present specification, "the active material" means a substance that can reversibly occlude and discharge (typically insert and desorb) chemical species serving as charge carriers in the secondary battery (e.g., lithium ions in the lithium secondary battery).

Figure 2:
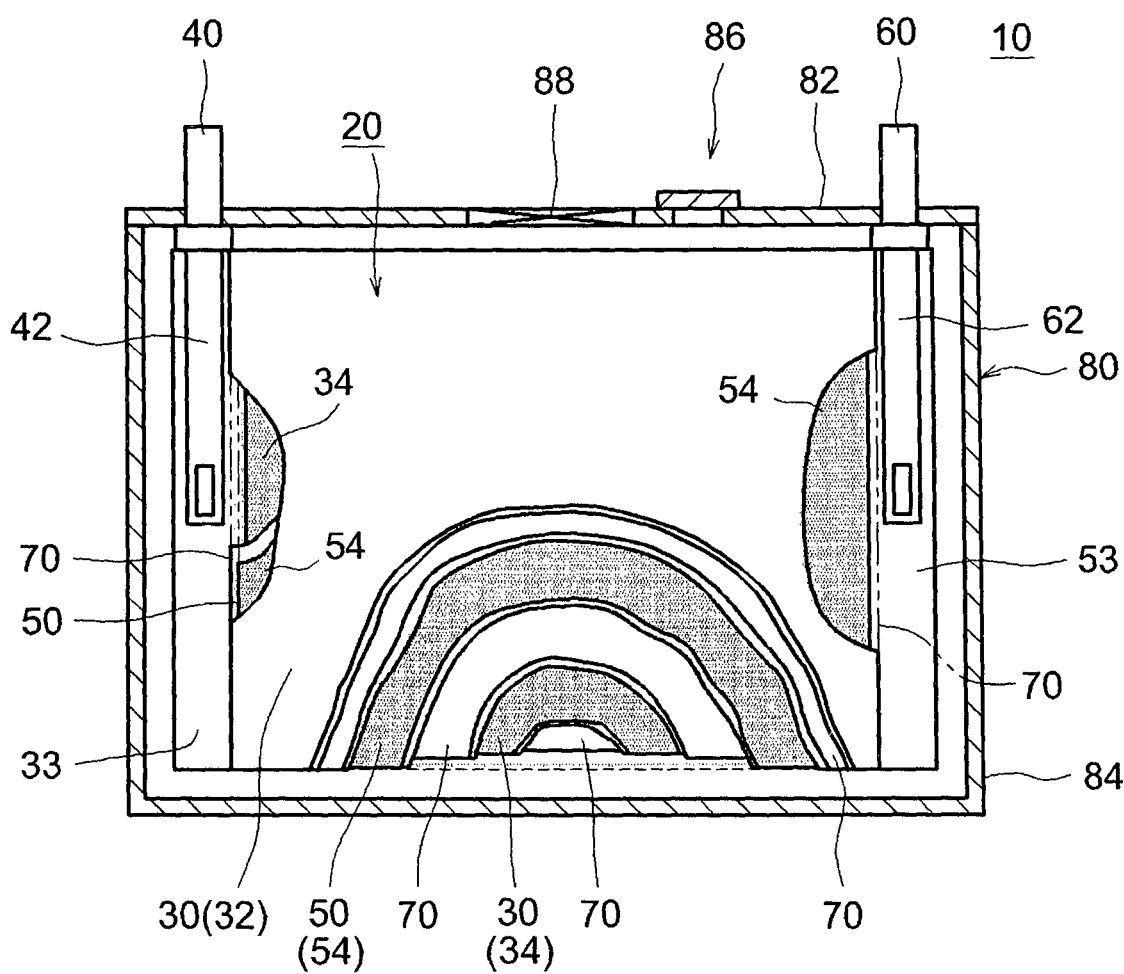
FIG. 2 is a longitudinal sectional view taken along a line II-II in FIG. 1.
Figure 3:
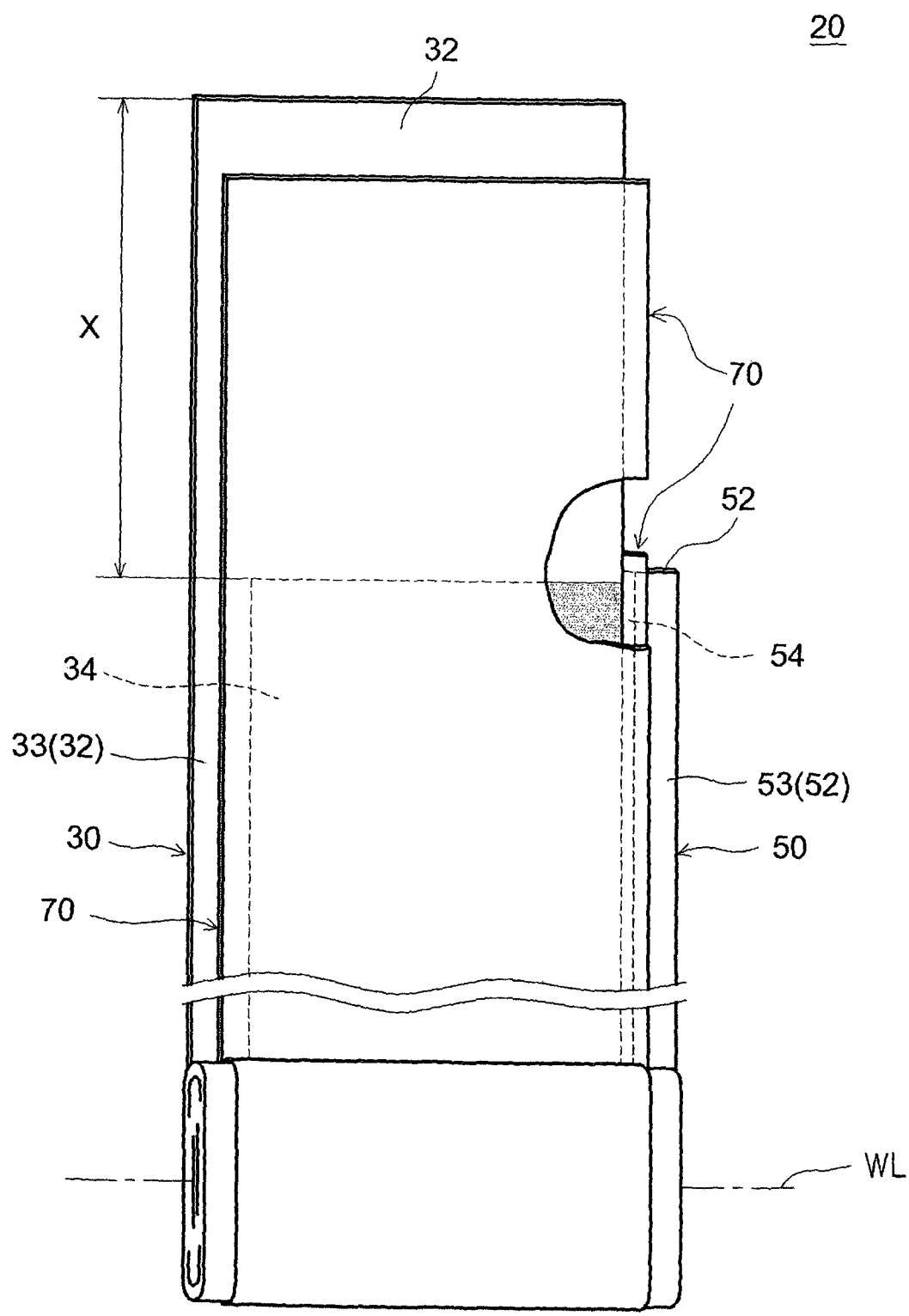
FIG. 3 is a view illustrating the configuration of a wound electrode body according to the embodiment of the invention.
Figure 4:
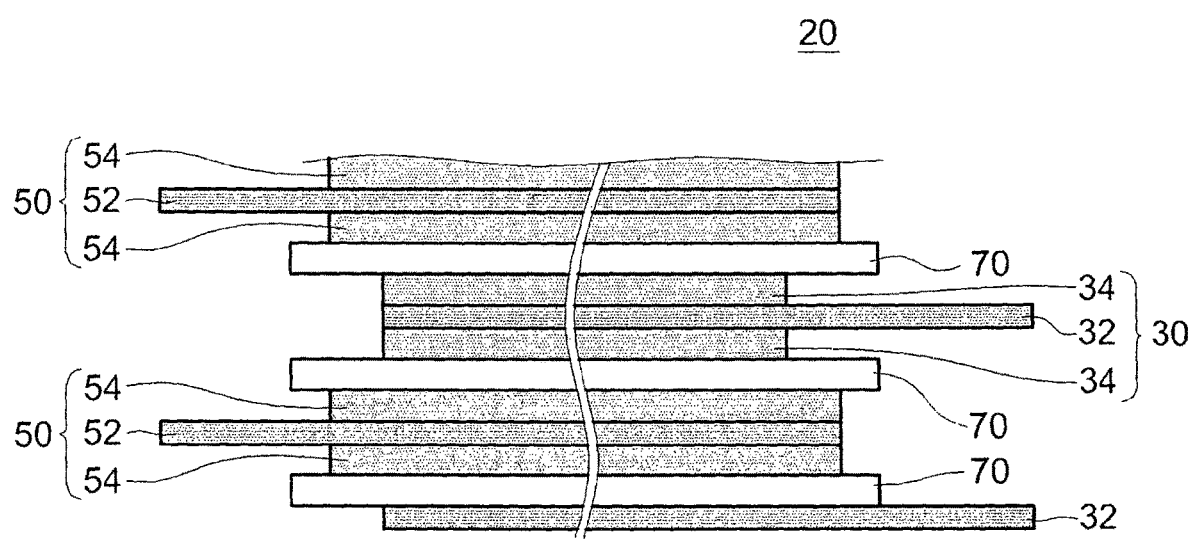
FIG. 4 is a sectional view schematically illustrating a laminated structure at an end of the electrode body according to the embodiment of the invention.

FIG. 1 is a perspective view schematically showing a lithium-ion battery 10 that is manufactured according to this embodiment of the invention. This lithium-ion battery 10 has a wound electrode body 20 provided in a battery case 80 that is constituted of a container body 84 and a lid body 82. FIG. 2 is a longitudinal sectional view taken along a line II-II in FIG. 1. FIG. 3 is a view illustrating the configuration of the wound electrode body 20. FIG. 4 is a sectional schematic view illustrating the configuration of the vicinity of an outermost periphery of the wound electrode body 20. In each of the drawings, members and regions that exert the same operation are denoted by the same reference symbol, and redundant description may be omitted. A dimensional relationship (length, width, thickness and the like) in each of the drawings does not necessarily reflect an actual dimensional relationship.

[Preparation of Wound Electrode Body]

As shown in FIGS. 1 to 4, the lithium-ion battery 10 that is manufactured according to this embodiment of the invention is the battery 10 that is equipped with the wound electrode body 20. Then, in the manufacturing method disclosed herein, first of all, the wound electrode body 20 configured as described below is prepared. This wound electrode body 20 is representatively configured by laminating a positive electrode sheet (a positive electrode) 30 that has positive electrode active material layers 34 provided on both faces of a long positive electrode current collector 32 respectively, and a negative electrode sheet (a negative electrode) 50 that has negative electrode active material layers 54 provided on both faces of a long negative electrode current collector 52 respectively on each other via two separators 70, and winding a lamination of the positive electrode 30, the negative electrode 50, and the separators 70.

It should be noted herein that the positive electrode 30 is provided, at one end thereof in a width direction, with a region where the positive electrode current collector 32 is exposed with the positive electrode active material layers 34 not formed (an uncoated portion 33). Besides, the negative electrode 50 is also provided, at one end thereof in the width direction, with a region where the negative electrode current collector 52 is exposed with the negative electrode active material layers 54 not formed (an uncoated portion 53). Also, typically, in consideration of reception properties of charge carriers (lithium ions in this case), the negative electrode active material layers 54 are often formed with a wider width than the positive electrode active material layers 34. Besides, in order to reliably insulate the positive electrode active material layers 34 and the negative electrode active material layers 54 from each other respectively, the two separators 70 are formed with a wider width than these layers.

Also, as shown in, for example, FIGS. 2 to 4, in the wound electrode body 20, the two separators 70 are arranged between the positive electrode active material layers 34 and the negative electrode active material layers 54, in such a manner as to cover them in the width direction respectively. Besides, the positive electrode 30 is laminated at one of both ends of the wound electrode body 20 in the direction of a winding axis (WL), with the uncoated portion 33 where the positive electrode active material layers 34 are not formed protruding from the negative electrode 50. The negative electrode 50 is laminated at the other of both the ends of the wound electrode body 20 in the direction of the winding axis (WL), with the uncoated portion 53 where the negative electrode active material layers 54 are not formed protruding from the positive electrode 30. It should be noted herein that the uncoated portions 33 and 53 are exposed in a spiral manner from both lateral portions of the separators 70 in the width direction thereof respectively in the wound electrode body 20.

From the standpoint of reception properties of lithium ions, the wound electrode body 20 is configured such that the negative electrode 50 is arranged on a relatively outer peripheral side, and that the positive electrode 30 is arranged on a relatively inner peripheral side. For example, as shown in FIG. 3, the positive electrode 30, the negative electrode 50, and the separators 70 are wound such that the negative electrode 50, the separator 70, the positive electrode 30, and the separator 70 are laminated on one another in this order from below. Also, in the manufacturing method disclosed herein, the wound electrode body 20 in which the positive electrode active material layers 34 are not formed at least on a surface of the positive electrode current collector 32 on a winding outer peripheral side thereof in a region X that includes at least an outermost periphery of the positive electrode 30 is prepared. Incidentally, FIG. 3 shows a case where the positive electrode active material layers 34 are not formed on either face of the positive electrode current collector 32 in the region X. On the other hand, for example, the positive electrode active material layers 34 may be formed on the positive electrode current collector 32 of the region X on a winding inner peripheral side thereof (above with respect to the drawing sheet in FIG. 3). Besides, in FIG. 3, the region X of the positive electrode 30 (the positive electrode current collector 32) is formed longer by such a length as to surround the outermost periphery of the wound electrode body 20 over an entire circumference or more. That is, there is shown a case where this region X is arranged on the winding outer peripheral side with respect to the negative electrode 50.

Furthermore, it suffices that the region X be long enough to constitute at least the outermost periphery of the positive electrode 30. For example, the region X may be formed with a length that is substantially equivalent to the outer periphery of the wound electrode body 20, or the length of the region X may be set sufficiently longer than the length equivalent to the outer periphery of the wound electrode body 20. More specifically, as exemplified in, for example, FIG. 3, the length of the positive electrode active material layers 34 may, be set shorter such that each of the positive electrode active material layers 34 is covered with a corresponding one of the negative electrode active material layers 54 that are opposed thereto in the winding direction (in the long direction), and accordingly, the length of the outermost peripheral region X of the positive electrode may be set longer than the length equivalent to the outer periphery of the wound electrode body 20. It is preferable that the length of the region X be set to a length that allows the outer periphery of the wound electrode body 20 to be wound over the entire circumference (e.g., about 1.2 times as long as the entire circumference). Incidentally, as shown in FIG. 3, the separators 70 may be formed with a length that is needed to ensure insulation of the positive electrode 30 from the negative electrode 50. Besides, for example, the separators 70 may be formed with such a length as to further surround the outer periphery of the outermost peripheral region X of the positive electrode, with a view to more reliably ensuring insulation of the region X from the outside (e.g., a battery case).

[Structuring of Secondary Battery]

In the manufacturing method disclosed herein, subsequently, the lithium-ion battery 10 is structured by having the wound electrode body 20 prepared as described above as well as a non-aqueous electrolyte (not shown) accommodated in the battery case 80. It should be noted herein that the battery case 80 is typically equipped on an outer side thereof with external connection terminals (a positive electrode external connection terminal 40 and a negative electrode external connection terminal 60), and is equipped on an inner side thereof with a positive electrode current collector terminal plate 42 and a negative electrode current collector terminal plate 62, so as to take out an electric power generated in the wound electrode body 20 to the outside. Also, in structuring the lithium-ion battery 10, the positive electrode 30 of the wound electrode body 20 and the negative electrode 50 of the wound electrode body 20 are connected to the positive electrode current collector terminal plate 42 and the negative electrode current collector terminal plate 62 respectively. In this manner, the lithium-ion battery 10 with lower internal resistance can be manufactured.

In the lithium-ion battery 10 thus structured, the surface of the positive electrode active material layer 34 that is located at the inner peripheral portion of the wound electrode body 20 is sandwiched by the positive electrode current collector 32 and a corresponding one of the separators 70. Besides, one of both the ends (the lateral face portions) of the positive electrode active material layer in the width direction thereof (in the direction of the winding axis thereof) is gently sandwiched by the positive electrode uncoated portion 33 that protrudes from the wound electrode body 20. Also, the other of both the ends (the lateral face portions) of the positive electrode active material layer in the width direction thereof (in the direction of the winding axis thereof) is gently sandwiched by the negative electrode uncoated portion 53 that protrudes from the wound electrode body 20. Accordingly, the positive electrode active material layers 34 that are located at the inner peripheral portion of the wound electrode body 20 are not open to the space formed in the battery case 80. Accordingly, for example, the contact with oxygen components contained inside the battery is suppressed.

Besides, the cross-sectional structure of the wound electrode body 20 in the vicinity of the outermost periphery thereof is configured as shown in, for example, FIG. 4. FIG. 4 is a cross-sectional view of an essential part of a region including the outermost periphery in the case where the wound electrode body is cut in the direction of the winding axis thereof. Respective layers, namely, the positive electrode current collector 32, the separator 70, the negative electrode 50, the separator 70, and the positive electrode 30, which constitute the region X, are laminated on one another in this order from below in FIG. 4. It should be noted herein that the general wound electrode body 20 can be configured such that the positive electrode current collector 32 constituting the region X does not exist. In such a case, the surface of the positive electrode active material layer 34 that is located at the outermost periphery of the positive electrode 30 (the lower positive electrode active material layer 34 in FIG. 4) is sandwiched by the positive electrode current collector 32 and a corresponding one of the separators 70. Besides, one of both the ends (the lateral face portions) in the width direction thereof (the direction of the winding axis thereof) is gently sandwiched by the negative electrode uncoated portion 53 that protrudes from the wound electrode body 20. However, the other of both the ends (the lateral face portions) in the width direction thereof (the direction of the winding axis thereof) is not sandwiched by the positive electrode uncoated portion 33, because the positive electrode current collector 32 constituting the region X does not exist. Accordingly, the positive electrode active material layer 34 that is located at the outermost periphery of the wound electrode body 20 can be in a state of being open to the space formed in the battery case 80. However, in the manufacturing method disclosed herein, the positive electrode current collector 32 in which the positive electrode active material layers 34 are not formed on the winding outer peripheral side in the region X of the wound electrode body 20 is arranged. Accordingly, the positive electrode active material layer 34 that is located on the outermost periphery of the wound electrode body 20 is not open either to the space formed in the battery case 80. Accordingly, for example, the contact with oxygen components contained in the battery is suppressed.

In this case, in structuring the secondary battery, it is preferable to bundle the uncoated portion 33 of the positive electrode 30 of the wound electrode body 20 in at least a region of the wound electrode body 20 in the circumferential direction thereof, and to connect the uncoated portion 33 of the positive electrode 30 to the positive electrode current collector terminal plate 42 in this bundled region without the intervention of another member. Besides, it is preferable to bundle the uncoated portion 53 of the negative electrode 50 of the wound electrode body 20 in at least a region of the wound electrode body 20 in the circumferential direction thereof, and to connect the uncoated portion 53 of the negative electrode 50 to the negative electrode current collector terminal plate 62 in this bundled region without the intervention of another member. In this manner, the ends of the positive electrode active material layers 34 are more reliably covered with the uncoated portions 33 and 53 respectively, and are more reliably restrained from coming into contact with oxygen components contained in the battery.

Besides, the wound electrode body 20 can be flatly squashed in a direction perpendicular to the winding axis in accordance with the shape of the battery case 80, and can be molded such that the cross-section thereof assumes an elliptical shape. In this flat-type wound electrode body 20, the uncoated portions 33 and 53 can be bundled in such a manner as to be in close contact with each other over a wider range. More specifically, the uncoated portions 33 and 53 can be gathered and bundled toward a position equivalent to a major axis of the elliptical cross-sectional shape, and these bundled regions can be welded and electrically bonded to the positive electrode current collector terminal plate 42 and the negative electrode current collector terminal plate 62 respectively. Owing to this configuration, the ends of the positive electrode active material layers 34 are reliably covered with the uncoated portions 33 and 53 respectively over a wide range. As a result, the ends of the positive electrode active material layers 34 are more reliably restrained from coming into contact with oxygen components contained in the battery. Besides, good electric connection is established between the respective current collectors 32 and 52 (the uncoated portions 33 and 53) and the positive and negative electrode current collector terminal plates 42 and 62. As a result, the small lithium-ion battery 10 with further reduced internal resistance can be manufactured.

[Conditioning Treatment]

In the manufacturing method disclosed herein, the secondary battery structured as described above may be subjected to a conditioning treatment prior to a high-temperature aging treatment as a subsequent process. The conditioning treatment is charge/discharge that is carried out to stabilize the performance of the battery, and the condition thereof is not limited in particular. For example, it is exemplified to repeatedly carry out charge/discharge several times at an appropriate current density.

[High-Temperature Aging Treatment]

Then, the secondary battery is subjected to an aging treatment in which the secondary battery is retained in a high-temperature range that is equal to or higher than 60° C., subsequently to the aforementioned conditioning treatment or without performing the aforementioned conditioning treatment. In this aging treatment, first of all, after preliminary charge is carried out such that the potential of the positive electrode becomes higher than an oxidation-reduction potential of metal foreign matters as an object of fusion, the secondary battery may be retained for a predetermined time while keeping the charge state. For example, in the case where copper (Cu) as metal foreign matters is fused, it is appropriate to set the voltage of the battery equal to or higher than 3.8 V as an oxidation-reduction potential of Cu. It is exemplified to set the voltage of the battery equal to or higher than 3.9 V etc., in anticipation of a voltage drop during the aging treatment.

Besides, the temperature of the aging treatment is set equal to or higher than 60° C., whereby a reaction that progresses during the aging treatment can be expected to be promoted. For example, the fusion reaction of metal foreign matters that have been mixed with the wound electrode body 20 can be suitably promoted. As a result, the reduction of process time and the reduction of manufacturing costs can be achieved. The temperature of the aging treatment can be typically set to a temperature higher than 60° C. The temperature of the aging treatment is preferably equal to or higher than 65° C. (e.g., a temperature that exceeds 65° C.), and more preferably equal to or higher than 70° C. (e.g., a temperature that exceeds 70° C.). Although the upper-limit of the temperature of the aging treatment is not limited in particular, it is exemplified to set the temperature of the aging treatment equal to or lower than about 85° C., in order to keep the stability of the configuration of the secondary battery 10. Incidentally, the time of this aging treatment can be appropriately set in consideration of the object of the aging treatment, the configuration (physical size) of the manufactured secondary battery 10, and the like. For example, it is possible to consider the physical size of the battery, the characteristics (e.g., the size, the fusibility into the electrolytic solution, and the like) of metal foreign matters as an object of fusion, and the like. In this manner, no general rule applies to the time of the aging treatment. For example, the time of the aging treatment can be set to about ½ to ¹/₁₀ of a time that is required for a general aging treatment that is performed in a temperature range of about 50° C. Using this time as a reference, the time of the aging treatment may be set.

In this manufacturing method, the positive electrode current collector is restrained from coming into direct contact with oxygen present in the battery. Thus, even if the battery is put in a high-temperature state, metal components are restrained from being eluted from the positive electrode active material. Accordingly, minor short-circuiting is restrained from occurring as a result of local precipitation of these metal components. This effect can also be obtained in the same manner for a battery that employs as a positive electrode active material, for example, a lithium transition metal compound oxide that contains manganese (Mn), which is likely to be eluted at a high temperature as well. Accordingly, the manufacturing method disclosed herein enables the manufacture of the battery including the aging treatment in a shorter time, without causing minor short-circuiting.

Hereinafter, more detailed description of the manufacturing method disclosed herein will be continued, citing an example of a method of manufacturing a lithium-ion battery as the embodiment of the invention. As described above, the positive electrode 30 is configured such that the positive electrode active material layers 34 are formed on the positive electrode current collector 32. A metal or alloy suited for the positive electrode 30 of the lithium-ion battery can be suitably employed as the positive electrode current collector 32. For example, it is possible to employ a rod-like body, a plate-like body, a foil-like body, a net-like body or the like that is mainly made of aluminum, nickel, titanium, stainless steel or the like. In this embodiment of the invention, a band-shaped aluminum foil with a predetermined width and a thickness of about 1 μm is used as the positive electrode current collector 32. Besides, the uncoated portion 33 is provided along an edge portion of the positive electrode current collector 32 on one side in the width direction thereof. Still further, in the region that includes at least the outermost periphery of the positive electrode 30, the positive electrode active material layers 34 are not formed on the surface of the positive electrode current collector 32 that serves at least as the winding outer peripheral side. The positive electrode active material layers 34 are formed at least on both the faces of the positive electrode current collector 32 respectively, except at the uncoated portions 33 that are set on the positive electrode current collector 32, and except on the winding outer peripheral side of the outermost peripheral region.

The positive electrode active material layers 34 contain at least the positive electrode active material. In this embodiment of the invention, the positive electrode active material layers 34 are mainly made of a grainy positive electrode active material. In addition to this grainy positive electrode active material, the positive electrode active material layers 34 include a conductive body for enhancing electric conductivity. These materials are stuck onto the aforementioned positive electrode current collector 32 by a binder. A void where the electrolytic solution can penetrate among the positive electrode active material grains is formed in each of these positive electrode active material layers 34.

As the positive electrode active material, it is possible to employ various substances that can be used as the positive electrode active material of the lithium-ion battery 10. More specifically, a material that can occlude and discharge lithium can be used as the positive electrode active material. One, two or more of various substances having such a characteristic can be employed without being limited in particular. As such a positive electrode active material, a lithium transition metal oxide (which is typically grainy) is suitably used. An oxide of a layered structure or an oxide of a spinel structure can be appropriately selected and employed. For example, it is preferable to employ one, two or more lithium transition metal oxides that are selected from a lithium nickel oxide (representatively, $LiNiO_2$), a lithium cobalt oxide (representatively, $LiCoO_2$), and a lithium manganese oxide (representatively, $LiMn_2O_4$).

It should be noted herein, for example, that "the lithium nickel oxide" is meant to encompass compound oxides that include one, two or more metal elements other than Li and Ni (i.e., transition metal elements and/or typical metal elements other than Li and Ni) at a ratio smaller than that of Ni (atomicity conversion, and in the case where two or more metal elements other than Li and Ni are included, at a ratio smaller than that of Ni as to any of these metal elements). This metal element or these metal elements can be one, two or more elements that are selected from a group made up of, for example, Co, Al, Mn, Cr, Fe, V, Mg, Ti, Zr, Nb, Mo, W, Cu, Zn, Ga, In, Sn, La and Ce. The same can hold true for lithium cobalt oxides and lithium manganese oxides.

Besides, the composition may be a ternary lithium transition metal oxide that includes three transition metal elements as expressed by a general formula: $Li(Li_aMn_xCo_yNi_z)O_2$ (a, x, y and z in the foregoing formula satisfy $a+x+y+z\approx1$ and $xyz\approx0$), a solid soluble-type lithium excess transition metal oxide as expressed by a general formula: $xLi[Li_{1/3}Mn_{2/3}]O_2 \cdot (1-x)LiMeO_2$ (in the foregoing formula, Me is one, two or more transition metals, and x satisfies $0<x\leq1$), or the like. Incidentally, these lithium transition metal oxides are expressed by the foregoing general formulae in order to clarify the constitutions thereof. However, it goes without saying that one or some of the transition metal elements in these rational formulae (less than 50 atom %) may be replaced with one, two or more elements that are selected from the metal element group that is made up of Co, Al, Mn, Cr, Fe and the like as exemplified above. As such a lithium transition metal oxide, more specifically, it is preferable to use, for example, a lithium excess transition metal oxide in which $D_{50}$ is about 3 to 8 μm and the specific surface (according to the BET method) is about 0.5 to 1.9 $m^2/g$. By using, for example, a lithium excess transition metal oxide, a solid soluble-type lithium excess transition metal oxide, or the like as a positive electrode active material, a lithium-ion battery that has both high-output characteristics and high-rate characteristics can be structured. Incidentally, in the present specification, $D_{50}$ denotes an average particle diameter expressed by cumulative 50% particle diameter (volume reference) in a particle size distribution measured according to the laser diffraction scattering method. Hereinafter, $D_{50}$ and the average particle diameter will be used in the same sense.

Furthermore, as the aforementioned positive electrode active material, a polyanion compound whose general formula is expressed by $LiMAO_4$ (it should be noted herein that M is at least one metal element that is selected from a group that is made up of Fe, Co, Ni and Mn, and that A is selected from a group that is made up of P, Si, S and V) can also be mentioned.

A compound constituting such a positive electrode active material can be prepared and made available according to a known method. For example, some raw material compounds that are appropriately selected in accordance with the composition of a target positive electrode active material are mixed with one another at a predetermined ratio, and the mixture is calcined by appropriate means. Thus, for example, an oxide as a compound constituting the positive electrode active material can be prepared. Incidentally, the method of preparing the positive electrode active material (typically, a lithium transition metal oxide) itself does not characterize the invention at all.

Besides, there is no strict restriction on the shape and the like of the positive electrode active material. The positive electrode active material prepared as described above can be crushed, granulated and sorted by appropriate means. For example, a lithium transition metal oxide powder that is substantially constituted by secondary particles whose average particle diameter ranges from about 1 to 25 μm (typically from about 2 to 15 μm) can be preferably adopted as the positive electrode active material according to this embodiment of the invention. Thus, a grainy positive electrode active material powder that is substantially constituted by secondary particles having a desired average particle diameter and/or a desired particle size distribution can be obtained.

A conductive body has the role of ensuring a conductive path between the positive electrode active material, whose electric conductivity is not very high, and the positive electrode current collector 32. As this conductive body, various conductive materials with good electric conductivity can be used. For example, a carbon material such as carbon powder, filamentous carbon or the like is preferably used. More specifically, the conductive body can be various kinds of carbon black (e.g., acetylene black, furnace black, graphitized carbon black, ketchen black), carbon powder such as graphite powder or the like, filamentous carbon such as needle graphite, vapor-phase growth carbon fiber (VGCF) or the like, etc. One, two or more of these materials may be used in combination. Alternatively, a conductive metal powder such as nickel powder or the like, etc. may be used.

As a binder, it is possible to use a polymer that can be dissolved or scattered into a solvent that is used in forming the positive electrode active material layers 34. For example, when the positive electrode active material layers 34 are formed using an aqueous solvent, a water-soluble or water-dispersible polymer such as a cellulose polymer such as carboxymethyl cellulose (CMC), hydroxypropylmethyl cellulose (HPMC) or the like, or for example, a fluororesin such as polyvinyl alcohol (PVA), polytetrafluoroethylene (PTFE), tetrafluoroethylene-hexafluoropropylene copolymer (FEP) or the like, a rubber material such as vinyl acetate copolymer, styrene-butadiene copolymer (SBR), acrylic acid modified SBR resin (SBR-type latex) or the like, etc. can be preferably adopted. Besides, when the positive electrode active material layers 34 are formed using a non-aqueous solvent, a polymer such as polyvinilidene fluoride (PVdF), polyvinilidene chloride (PVdC), polyacrylonitrile (PAN) or the like can be preferably adopted.

The positive electrode active material layers 34 can be formed, for example, as follows. The aforementioned positive electrode active material, the aforementioned conductive body, and the aforementioned binder are mixed with the solvent and prepared into a paste-like (or slurry-like etc.) composition for forming the positive electrode active material layers. This material is applied to the positive electrode current collector 32 and dried. After that, this material is rolled according to need, so that the positive electrode active material layers 34 can be formed. In this case, as described above, the positive electrode active material layers 34 are formed on both the faces of the positive electrode current collector 32 respectively, in the region other than the uncoated portion 33 that is set on the positive electrode current collector 32, and the winding outer peripheral side of the outermost peripheral region. Both an aqueous solvent and a non-aqueous solvent can be employed as a solvent of the composition for forming the positive electrode active material layers. As a preferred example of the non-aqueous solvent, typically, N-methyl-2-pyrrolidone (NMP) can be mentioned. The polymer material exemplified as the aforementioned binder can also be used for the purpose of exerting a function as a thickening agent, an addition agent or the like for the composition for forming the positive electrode active material layers, in addition to a function as a binder. Incidentally, a vehicle may be used instead of the aforementioned solvent.

In this case, although not restricted in particular, it is exemplified that the amount of use of the conductive body is 1 to 20 mass parts (preferably 5 to 15 mass parts) for 100 mass parts of the positive electrode active material. Besides, it is exemplified that the amount of use of the binder is 0.5 to 10 mass parts for 100 mass parts of the positive electrode active material.

The negative electrode 50 has the negative electrode active material layers 54, which include the negative electrode active material, provided on the negative electrode current collector 52. A metal suited for the negative electrode can be suitably employed as the negative electrode current collector 52. For example, it is possible to employ a rod-like body, a plate-like body, a foil-like body, a net-like body or the like that is mainly made of copper, nickel, titanium, stainless steel or the like. In this embodiment of the invention, a band-shaped copper foil with a predetermined width and a thickness of about 10 μm is used as the negative electrode current collector 52. The uncoated portion 53 is set along an edge end portion of this negative electrode current collector 52 on one side thereof in the width direction. The negative electrode active material layers 54 are formed on both the faces of the negative electrode current collector 52 respectively, except at the uncoated portion 53 that is set on the negative electrode current collector 52.

In this embodiment of the invention, the negative electrode active material layers 54 mainly include a grainy negative electrode active material. This negative electrode active material is firmly fixed on the aforementioned negative electrode current collector 52 by the binder. In the negative electrode active material layers 54 thus formed, a void where the electrolytic solution can penetrate is formed among negative electrode active material particles.

As the negative electrode active material, one, two or more of materials used for a lithium-ion battery can be employed without being restricted in particular. For example, a grainy carbon material (carbon particles) that at least partially includes a graphite structure (a layered structure) can be mentioned. More specifically, the negative electrode active material can be, for example, natural graphite, a graphite class (graphite), a hard-to-graphitize carbon class (hard carbon), an easy-to-graphitize carbon class (soft carbon), a material obtained by coating these carbon materials with amorphous carbon, a carbon material obtained by combining two or more of these materials, or the like. For example, specifically, it is preferable to use graphite covered with amorphous carbon in which $D_{50}$ is about 8 to 11 μm and the specific surface (according to the BET method) is about 3.5 to 5.5 m$^2$/g.

Besides, as the negative electrode active material, it is also appropriate to use a metal compound whose constituent metal elements are, for example, Si, Ge, Sn, Pb, Al, Ga, In, As, Sb, Bi and the like (preferably silicide or a metal oxide) or the like. For example, LTO (lithium titanate) can also be used as the negative electrode active material particles. The negative electrode active material that is made of a metal compound may be used as, for example, a grainy body that is obtained by sufficiently coating the surface of the metal compound with a carbon coating and exhibits excellent electric conductivity. In this case, the conductive body may not be contained in the negative electrode active material layers, or the amount of blending of the conductive body as described below may be reduced in comparison with the case where the surface is not coated with carbon. The additional properties, configurations such as particle diameter and the like of these negative electrode active materials can be appropriately selected in accordance with a desired characteristic.

Besides, although not restricted in particular, the negative electrode active material layers 54 may include a conductive body. The conductive body can be employed for the purpose of ensuring a conductive path between the negative electrode active material, whose electric conductivity is not high, and the negative electrode current collector 52. As such a conductive body, the conductive body in the aforementioned positive electrode active material layers can be used in a similar manner.

The negative electrode active material layers 54 can be typically formed by coating the surface of the aforementioned negative electrode current collector 52 with a composition for forming the negative electrode active material layers, which includes the aforementioned negative electrode active material, the binder and also the conductive body according to need. It should be noted herein that as the binder, solvent and thickening agent of the negative electrode active material layers 54, the materials exemplified as the binder, solvent and thickening agent of the aforementioned positive electrode active material layers 34 can be used in a similar manner. As the solvent, both the aqueous solvent and the non-aqueous solvent that are used in the aforementioned positive electrode active material layers 34 can be employed. N-methyl-2-pyrrolidone (NMP) can be mentioned as a preferred example of the non-aqueous solvent. Besides, the polymer material exemplified as the binder of the aforementioned positive electrode active material layers 34 can also be employed for the purpose of exerting a function as a thickening agent or another addition agent for the composition for forming the negative electrode active material layers in addition to a function as the binder.

Incidentally, in the case where the conductive body is used, it is exemplified that the amount of use thereof is about 1 to 30 mass parts (preferably about 2 to 20 mass parts, for example, about 5 to 10 mass parts) for 100 mass parts of the negative electrode active material. Besides, the amount of use of the binder for 100 mass parts of the negative electrode active material can be set to, for example, 0.5 to 10 mass parts.

The separators 70 are component members that insulate the positive electrode 30 and the negative electrode 50 from each other, retain the electrolyte, and permit the movement thereof. As these separators 70, a porous body, a non-woven fabric body, a cloth body or the like that has pores that are fine enough to allow lithium ions as charge carriers to move can be used without being restricted in particular. For example, a porous sheet made of resin (a fine porous resin sheet) can be favorably used. This resin material is not limited in particular either. A general resin material can be employed. Representatively, polyethylene (PE), polypropylene (PP), polystyrene, polytetrafluoroethylene, polyamide (especially preferably, aramid), polyimide, polyvinylidene fluoride, polyacrylonitrile, polyamideimide and the like can be mentioned. No strict restriction is imposed on the thickness of the separators 70. For example, the separators 70 are desired to have a thickness of about 10 to 30 μm more preferably about 15 to 25 μm.

As described already, the wound electrode body 20 typically has the long positive electrode (the positive electrode sheet) 30, the long negative electrode (the negative electrode sheet) 50, and the two separators. In fabricating the wound electrode body 20, as shown in FIG. 3, the negative electrode sheet 50, the separator 70, the positive electrode sheet 30, and the separator 70 are laminated on one another, for example, in this order from below. At this time, the positive electrode sheet 30 and the negative electrode sheet 50 are superimposed on each other while being slightly displaced from each other in the width direction, such that the uncoated portion 33 of the positive electrode active material layers 34 of the positive electrode sheet 30 and the uncoated portion 53 of the negative electrode active material layers 54 of the negative electrode sheet 50 stick out from both ends of the separators 70 in the width direction thereof in different directions respectively. The electrode body obtained through this superimposition is wound such that the negative electrode sheet 50 is located on the outer peripheral side. In the case of this drawing, the positive electrode sheet 30 and the separators 70 are wound over an entire circumference or more to form the wound electrode body 20. Incidentally, as regards the longitudinal dimensions of the negative electrode sheet 50, the separators 70, and the positive electrode sheet 30, it is appropriate to adopt a configuration in which the positive electrode 30 (which can be the positive electrode current collector 32) is wound around the outermost periphery over an entire circumference or more. For example, it is also appropriate to adopt a configuration in which the winding end positions of these components are substantially the same. Subsequently, the obtained wound electrode body 20 is crushed and squashed from a direction perpendicular to a winding axis WL, whereby the flat-type wound electrode body 20 is completed. Thus, the wound electrode body 20 in which the positive electrode active material layers 34 are not formed at the outermost periphery of the positive electrode sheet 30 on the winding outer peripheral side thereof can be prepared.

Subsequently, as shown in FIG. 2, this wound electrode body 20 is accommodated in the battery case 80. In this embodiment of the invention, the battery case 80 is a so-called rectangular battery case, and is equipped with the container body 84 and the lid body 82. The container body 84 is a flat box-shaped container that assumes the shape of a bottomed rectangular tube and has an opening through one lateral face thereof (an upper face in FIG. 2). The lid body 82 is a member that is attached to the opening of (the opening through the upper face of) the container body 84 to close up this opening. For example, in an in-vehicle secondary battery, with a view to improving fuel economy of the vehicle, it is desirable to enhance the weight energy efficiency (the capacity of the battery per unit weight). Thus, in this embodiment of the invention, a light metal such as aluminum, an aluminum alloy or the like is adopted for the container body 84 and the lid body 82 that constitute the battery case 80. Thus, the weight energy efficiency can be enhanced. Besides, the lid body 82 is provided with a liquid injection port 86 for injecting the electrolytic solution, and a safety valve 88 that is released when the pressure in the battery case 80 exceeds a predetermined value. Furthermore, the positive electrode external connection terminal 40 and the negative electrode external connection terminal 60 are attached to the lid body 82 in such a manner as to protrude outward from the battery case 80. Besides, the positive electrode external connection terminal 40 and the negative electrode external connection terminal 60 are connected to the positive electrode current collector terminal plate 42 and the negative electrode current collector terminal plate 62 inside the battery case 80, respectively. These positive and negative electrode external connection terminals 40 and 60 and these positive and negative electrode current collector terminal plates 42 and 62 are fixed in a state of being electrically insulated from the battery case 80.

As shown in FIG. 2, the flat internal space of the battery case 80 is slightly wider in lateral width than the wound electrode body 20. Thus, the uncoated portion 33 of the positive electrode current collector 32 and the uncoated portion 53 of the negative electrode current collector 52, which stick out from both the ends of the wound electrode body 20 respectively, are bundled in a pinching manner in the vicinity of the centers thereof respectively, and are connected to the positive electrode current collector terminal plate 42 and the negative electrode current collector terminal plate 62, which are fixed to the lid body 82, respectively. In this state, the wound electrode body 20 is accommodated in the flat inner space of the container body 84. Thus, electricity generated in the wound electrode body 20 can be taken out to the outside, and the wound electrode body 20 can be positioned in the battery case 80. In this case, due to the difference between the respective materials, the positive electrode current collector terminal plate 42 and the positive electrode uncoated portion 33 are connected to each other through the use of, for example, ultrasonic welding. Besides, the negative electrode current collector terminal plate 62 and the negative electrode uncoated portion 53 are welded to each other through the use of, for example, resistance welding. After the wound electrode body 20 is accommodated, the container body 84 can be tightly closed by the lid body 82. A joint between the lid body 82 and the container body 84 can be sealed by, for example, being welded through laser welding.

After that, the electrolyte is injected into the battery case 80 from the liquid injection port 86 that is provided through the lid body 82. It should be noted herein that the electrolyte is preferably injected in dry air with a view to reducing the amount of moisture in the battery case 80. As this electrolyte, one, two or more of electrolytes that are similar to the non-aqueous electrolyte used for a general lithium-ion battery can be employed without being restricted in particular. This non-aqueous electrolyte typically includes a lithium salt as a support electrolyte salt in a non-aqueous solvent (typically, an organic solvent), and a non-aqueous electrolyte (i.e., an electrolytic solution) that is liquid at room temperature can be preferably employed.

As the non-aqueous solvent used for this electrolyte, a non-proton solvent such as a carbonate group, an ester group, an ether group, a nitrile group, a sulfone group, a lactone group or the like can be used. Ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethyleneglycol dimethylether, ethylene glycol dimethylether, acetonitrile, propionitrile, nitromethane, N, N-dimethyl formamide, dimethyl sulfoxide, sulfolane, γ-butyrolactone, and the like are exemplified.

As the lithium salt, a known lithium salt that is used as a support electrolyte salt of a non-aqueous electrolyte for a general lithium-ion battery can be appropriately selected and employed. As this lithium salt, $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$, and the like are exemplified. Only one of these support electrolyte salts can be used alone, or two or more of these support electrolyte salts can be used in combination. As an especially preferable example, $LiPF_6$ can be mentioned. As the aforementioned non-aqueous electrolyte, a non-aqueous electrolytic solution that contains the aforementioned support electrolyte salt at a concentration of about 0.1 to 5 mol/L, for example, about 0.8 to 1.5 mol/L can be preferably used. Incidentally, it is also appropriate to use a solid (gelatinous) electrolytic solution that is obtained by adding a polymer to this liquid electrolytic solution. The solid (gelatinous) electrolytic solution itself can be used instead of the separators.

Various addition agents can be contained in the electrolytic solution. For example, as an overcharge inhibitor, a compound whose oxidation potential is equal to or higher than a working voltage of the lithium-ion battery (e.g., equal to or higher than 4.2 V in the case where the lithium-ion battery is fully charged at 4.2 V) and which produces a large amount of gas upon being oxidized can be used without being limited in particular. For example, among lithium-ion batteries that are fully charged at 4.2 V, those with an oxidation reaction potential ranges from 4.6 V to 4.9 V are preferably used. For example, biphenyl compounds, cycloalkylbenzene compounds, alkylbenzene compounds, organic phosphorus compounds, fluorine atom-substituted aromatic compounds, carbonate compounds, cyclic carbamate compounds, alicyclic hydrocarbons, and the like can be mentioned. More specifically, biphenyl (BP), alkyl biphenyl, terphenyl, 2-fluorobiphenyl, 3-fluorobiphenyl, 4-fluorobiphenyl, 4,4'-difluorobiphenyl, cyclohexylbenzene (CHB), trans-butylcyclohexylbenzene, cyclopentylbenzene, t-butylbenzene, t-aminobenzene, o-cyclohexylfluorobenzene, p-cyclohexylfluorobenzene, tris-(t-butylphenyl) phosphate, phenyl fluoride, 4-fluorophenyl acetate, diphenyl carbonate, methyl phenyl carbonate, bis-tertiary butyl phenyl carbonate, diphenyl ether, dibenzofuran, and the like can be mentioned. In particular, cyclohexylbenzene (CHB) or a cyclohexylbenzene derivative is preferably used. The amount of use of the overcharge inhibitor for 100 mass % of the used electrolytic solution can be set to, for example, about 0.01 to 10 mass %, preferably, about 0.1 to 5 mass %.

In this example, as the electrolytic solution, an electrolytic solution that is obtained by causing a mixed solvent of ethylene carbonate and diethyl carbonate (e.g., a mixed solvent with a volume ratio of about 1:1) to contain $LiPF_6$ at a concentration of about 1 mol/L is used. After that, a metal sealing cap 87 is attached (e.g., welded) to the liquid injection port 86 to seal the battery case 80. Thus, the lithium-ion battery 10 as a non-aqueous electrolyte secondary battery can be manufactured.

In this lithium-ion battery 10, the positive and negative uncoated portions 33 and 53 protrude from both the ends of the wound electrode body 20 in the direction of the winding axis thereof respectively. In addition, the positive electrode active material layers 34 are not arranged on the winding outer peripheral side of the region X. Thus, the positive electrode active material layers 34 are not directly open to the space in the battery case 80, and can be in an isolated state. Thus, even in the case where, for example, the aging treatment is performed at a high temperature that is equal to or higher than 60° C., the metal components are restrained from being eluted from the positive electrode active material, due to the influence of oxygen contained in the battery, or the like. Accordingly, minor short-circuiting can be restrained from occurring in the vicinity of the ends of the positive electrode active material layers 34, especially the ends of the region X on the winding outer peripheral side thereof. Thus, this lithium-ion battery 10 can be manufactured as a battery with more excellent reliability.

Although the non-aqueous electrolyte battery disclosed herein has been described above, the detailed configuration, mode, capacity, purpose of use and the like of this secondary battery are not limited to those of the foregoing example. For example, in the foregoing, the secondary battery that is equipped with the wound electrode body has been described in detail with reference to the drawings. However, the invention disclosed herein is also suitably applicable to a lamination-type electrode body as well. Besides, the rectangular secondary battery has been described. However, no special restriction is imposed on the shape (e.g., a metal housing, a cylindrical structure, a button-type structure, or a laminate film structure) and size of the battery case constituting this battery, or on the constituent elements of the positive electrode active material and the negative electrode active material, or the like.

Incidentally, the possibility of minor short-circuiting in the aforementioned high-temperature aging treatment at the temperature equal to or higher than 60° C. can also be eliminated from another aspect. For example, it is advisable to reduce the amount of oxygen mentioned as a cause 2) of the occurrence of minor short-circuiting. That is, the method of reducing the amount of oxygen in the battery case disclosed herein encompasses reducing the amount of oxygen in the battery case 80 to a range of 0.2 to 2 mL. Incidentally, the value of 0.2 to 2 mL as the amount of oxygen is a value regarding a battery having a battery case whose size (inner volume) is about 120 mL, and a space of about 20 to 30 mL can be formed in this battery. An almost entire amount of oxygen in the battery case 80 is considered to react during the aging treatment. Thus, the preferable range of this amount of oxygen can be considered to be an absolute amount. However, for example, in the case where the size of the battery is extremely different, this preferred amount of oxygen may also vary. Accordingly, the aforementioned amount of oxygen can also be appropriately increased/reduced in consideration of the volume of the space formed in the battery case (typically, in proportion to the volume of the space). For example, it is also appropriate to make an adjustment such that the amount of oxygen becomes about 1 to 8 volume % in the space in the battery case.

An excess of the amount of oxygen in the battery case 80 over 2 mL is not preferred because metal elements are eluted from the positive electrode active material, for example, in the case where the high-temperature aging treatment is performed at the temperature that is equal to or higher than 60° C. Thus, the amount of oxygen is prescribed as equal to or smaller than 2 mL. The amount of oxygen can be set, for example, equal to or smaller than 1.8 mL. On the other hand, it is preferable to set the amount of oxygen in the battery case 80 smaller than 0.2 mL, in that metal elements can be more reliably restrained from being eluted from the aforementioned positive electrode active material. However, in order to restrain the metal elements from being eluted to the extent of suppressing minor short-circuiting, it is not indispensable to reduce the amount of oxygen below 0.2 mL. Besides, in order to realize this amount of oxygen, for example, special means for placing part of a manufacturing line under an inactive atmosphere etc. is required. The installation of such special means is not preferred because an excessive increase in cost is caused. In consideration of this matter, in the method disclosed herein, the amount of oxygen is prescribed as being reduced to a level that is equal to or larger than 0.2 mL. This amount of oxygen can be set, for example, equal to or larger than 0.3 mL.

As a preferred mode for setting the amount of oxygen in the battery case 80 to the range of 0.2 to 2 mL, specifically, it is exemplified to purge the gas in the battery case 80 (typically air) by an inactive gas. As the inactive gas, a rare gas such as helium (He), neon (Ne), argon (Ar) or the like, nitrogen, a low-oxygen gas with a reduced oxygen concentration (or with a reduced oxygen partial pressure), or the like can be considered. This purge can be easily carried out by, for example, purging the interior of the battery case 80 by the inactive gas at any stage from the injection of the electrolyte (the electrolytic solution) to the sealing of the liquid injection port 86 in manufacturing the aforementioned non-aqueous electrolyte secondary battery.

More specifically, it is exemplified to carry out purge according to the following procedure. That is, first of all, when the electrolytic solution is injected into the battery case 80, a liquid injection nozzle (e.g., a ribbed liquid injection nozzle made of an elastic material or the like) capable of sealing the liquid injection port 86 is pressed against the liquid injection port 86. The interior of the battery case 80 is depressurized to, for example, about −90 kPa through the liquid injection nozzle. Subsequently, the inactive gas is injected from the liquid injection port 86 into the battery case 80 together with the predetermined electrolyte solution. Upon the completion of injection of a predetermined amount of the electrolytic solution, the liquid injection nozzle is removed, and a sealing lid (not shown) is immediately attached to the liquid injection port to seal it. The sealing lid may be more reliably and air-tightly fixed through, for example, laser welding. This liquid injection port 86 is preferably sealed within, for example, 10 seconds after the injection of the electrolytic solution.

Incidentally, according to studies conducted by the inventors, it has been confirmed that minor short-circuiting does not occur and the amount of self-discharge is extremely small even in the case where a battery in which the amount of oxygen in the battery case has been reduced according to the aforementioned method of reducing the amount of oxygen in the battery case has been subjected to, for example, the high-temperature aging treatment at the temperature that is equal to or higher than 60° C. Accordingly, according to this method, the amount of oxygen in the battery case 80 can be reduced, and for example, the battery 10 can be subjected to the high-temperature aging treatment at the temperature that is equal to or higher than 60° C. without causing minor short-circuiting. Incidentally, by carrying out this method of reducing the amount of oxygen in the battery case in conjunction with the method of manufacturing the non-aqueous electrolyte secondary battery disclosed herein, minor short-circuiting can be more reliably restrained from occurring in the high-temperature aging treatment. The secondary battery that has high-capacity characteristics and high-output characteristics can be manufactured with higher quality.

Next, one example of the invention will be described. It should be noted, however, that the following description is not intended to limit the invention to this concrete example.

[Preparation of Evaluation Cell]

A lithium secondary battery that is equipped with a wound electrode body as an evaluation cell was structured according to the following procedure.

(Sample 1)

«Positive Electrode»

$LiNi_{1/3}CO_{1/3}Mn_{1/3}O_2$ as a positive electrode active material, carbon black (CB) as a conductive body, and polyvinylidene fluoride (PVDF) as a binding agent were used. These materials were blended in such a manner as to achieve a mass ratio of 90:8:2. By mixing these materials with N-methyl-2-pyrrolidone (NMP) as a solvent, a paste for forming the positive electrode active material layers was prepared. Subsequently, the paste for forming the positive electrode active material layers was applied to both faces of an aluminum foil (with a thickness of about 15 μm) as the positive electrode current collector, while leaving the uncoated portion along one end of each of both the faces, such that the coating amount (the weight) of the positive electrode active material per unit area would become equal to 11 $mg/cm^2$ per both the faces. After application, the aluminum foil was prepared through the use of a roller press such that the density of the positive electrode active material layers would become equal to 2.2 $g/cm^3$, and was dried. This product was slit in such a manner as to have a predetermined width, so that the positive electrode in which the positive electrode active material layers have a width of 9.8 cm and a length of 300 cm was prepared.

«Negative Electrode»

Spherical graphite as a negative electrode active material, styrene butadiene block copolymer (SBR) as a binding agent, carboxy methyl cellulose (CMC) as a thickening agent were used. These materials were blended in such a manner as to achieve a mass ratio of 98:1:1. By mixing this blend with ion-exchange water as a solvent, the paste for forming the negative electrode active material layers was prepared. This paste for forming the negative electrode active material layers was applied to both faces of a copper foil (with a thickness of about 10 μm) as the negative electrode current collector, while leaving the uncoated portion along one end of each of both the faces, such that the coating amount (the weight) of the negative electrode active material per unit area would become equal to 7 $mg/cm^2$ per both the faces. After application, the copper foil was prepared through the use of the roller press such that the density of the negative electrode active material layers would become equal to 1.1 $g/cm^3$, and was dried. This product was slit in such a manner as to have a predetermined width, so that the negative electrode in which the negative electrode active material layers have a width of 10.2 cm and a length of 310 cm was prepared.

«Separators»

As the separators, fine porous sheets that have a thickness of 25 μm and are made of polypropylene (PP) were used.

«Assembly of Evaluation Cell»

A lithium secondary battery for evaluation was structured using the two separators, the single positive electrode, and the single negative electrode, which were prepared. That is, the positive electrode and the negative electrode were laminated on each other via the separators interposed therebetween, such that the mutual uncoated portions would be located opposite each other in the width direction, and that the negative electrode active material layers would cover the positive electrode active material layers in the width direction. This laminated body was wound around a shaft with a diameter of about 4 cm such that the negative electrode would be located on the winding outer peripheral side, to form a wound body. After that, the shaft was removed, and the wound body was crushed in the diametrical direction and flatly squashed, whereby a wound electrode body was fabricated. A positive electrode terminal was bonded through welding to the uncoated portion of the positive electrode current collector that protrudes from one end of this wound electrode body in the shape of an elliptical swirl. By the same token, a negative electrode terminal was bonded through welding to the uncoated portion of the negative electrode current collector.

This wound electrode body was accommodated in the rectangular battery case made of aluminum, and 35 mL of the non-aqueous electrolytic solution was injected from the liquid injection port. This liquid injection was carried out in dry air. As the electrolytic solution, a liquid that was obtained by dissolving $LiPF_6$(LPFO) as a lithium salt into a solvent, which was obtained by mixing ethylene carbonate (EC), dimethyl carbonate (DMC), and ethyl methyl carbonate (EMC) at (a volume ratio of) 3:4:3, at a concentration of 1 mol/L was used. After the electrolytic solution was injected, a lid body was fitted, welded and bonded to an opening portion of the battery case, whereby a lithium secondary battery (sample 1) was structured. 10 cells of the lithium secondary battery for evaluation according to this sample 1 were made available.

(Sample 2)

The aforementioned sample 1 was formed such that the positive electrode would have a length of about 312 cm, which is longer by the entire circumference of the outermost periphery of the wound electrode body. As regards the winding end portion (the outermost periphery) with a length of 12 cm, the positive electrode active material layers were formed only in a region equivalent to one side of the winding inner peripheral side. A lithium secondary battery (sample 2) was structured with its other configurational details made the same as in sample 1. That is, the lithium secondary battery according to sample 2 was configured by winding the positive electrode current collector, which is equipped with the positive electrode active material layers only on the winding inner peripheral side thereof, around the outermost peripheral layer of the wound electrode body over the entire circumference. In this case as well, 10 cells of the lithium secondary cell for evaluation according to this sample 2 were made available.

(Sample 3)

The aforementioned sample 1 was formed such that the length of the positive electrode would become equal to about 312 cm, which is longer by the entire circumference of the outermost periphery of the wound electrode body. As regards the winding end portion (the outermost periphery) with a length of 12 cm, the positive electrode active material layers are not formed on both the faces. A lithium secondary battery (sample 3) was structured with its other configurational details made the same as in sample 1. That is, the lithium secondary battery according to sample 3 was configured by winding only the positive electrode current collector around the outermost peripheral layer of the wound electrode body over the entire circumference. In this case as well, 10 cells of this lithium secondary battery for evaluation according to sample 3 were made available.

[Conditioning]

The lithium secondary batteries for evaluation according to samples 1 to 3 structured above were charged at a constant current (CC charge) such that the voltage value (the voltage value between the positive and negative electrode terminals) would become equal to 4.1 V at a charge rate of 1C, then discharged at a constant current (CC discharge) to 3.92 V, and charged again at a constant current and a constant voltage (CCCV charge) to 3.97 V, under a temperature condition of a room temperature (25° C.). As a result, a 3.97 charged battery was made available.

[Aging]

The respective lithium secondary batteries that had been subjected to conditioning were retained for 20 hours under a high-temperature condition of 80° C., and were thereby subjected to the aging treatment.

[Self-Discharge Inspection]

After the aforementioned aging treatment, the voltage of the respective batteries upon the lapse of 5 hours at the room temperature (25° C.) was set as an initial voltage ($V_{ini}$). Furthermore, the battery voltage after the preservation for 72 hours at 25° C. was set as a measured voltage ($V_{72h}$). A value that was obtained by subtracting $V_{ini}$ from $V_{72h}$, namely, ($V_{72h}-V_{ini}$) was set as a self-discharge amount ($V_{SD}$). Among batteries according to this specification, there is established a relationship: $V_{SD}$<2 mV in normal batteries. On the other hand, the value of $V_{SD}$ is high in each cell in which minor short-circuiting has occurred. In this embodiment of the invention, each cell with $V_{SD}$ higher than 5 mV was defined as a minor short-circuiting cell. As for the respective 10 cells of the lithium secondary batteries according to samples 1 to 3, the number of those cells in which this self-discharge amount ($V_{SD}$) is larger than 5 mV was counted, and was shown in Table 1.

[Visual Inspection of Scrapping]

The respective lithium secondary batteries that had been subjected to the aforementioned self-discharge inspection were carefully scrapped in a glove box, and the conditions of the electrode bodies were observed. As for those batteries in which Mn components were eluted from the positive electrode active material, discoloration was confirmed on the negative electrode and the separators, so that the presence or absence of this discoloration was visually confirmed. As for the respective lithium secondary batteries according to samples 1 to 3, the number of those in which the elution of Mn was confirmed was counted, and was shown in Table 1.

TABLE 1

| Sample | $V_{SD}$ > 5 mV (Quantity/Quantity) | Elution of Mn (Quantity/Quantity) |
|---|---|---|
| 1 | 8/10 | 10/10 |
| 2 | 0/10 | 0/10 |
| 3 | 0/10 | 0/10 |

In the lithium secondary battery according to sample 1 in which the positive electrode active material layers are provided on the outermost periphery of the positive electrode, the self-discharge amount $V_{SD}$ of 80% of the cells exceeded 5 mV in the self-discharge inspection after the high-temperature aging treatment. As a result, it could be confirmed that the occurrence of minor short-circuiting through high-temperature aging was remarkable. On the other hand, as for the lithium secondary batteries according to samples 2 and 3 in which the positive electrode active material layers are not provided on the outermost periphery of the positive electrode, the self-discharge amount of all the cells after the high-temperature aging treatment was equal to or smaller than 1.5 mV. As a result, it could be confirmed that minor short-circuiting through high-temperature aging was suppressed. Besides, in the visual inspection of scrapping, as for all the cells of the lithium secondary battery according to sample 1, it was confirmed that the negative electrode and the separators were discolored. That is, as to the two cells in which the self-discharge amount $V_{SD}$ was equal to or smaller than 5 mV as well, the elution of Mn from the positive electrode and the precipitation of Mn onto the negative electrode and the separators were confirmed. That is, it was revealed that the elution and precipitation of Mn components had occurred although this elution amount was small. On the other hand, as for all the cells of the lithium secondary batteries according to samples 2 and 3, discoloration of the negative electrode and the separators was not confirmed. As a result, it was found out that the elution itself of Mn from the positive electrode was very well suppressed. That is, it could be confirmed that the elution of metal components from the positive electrode active material during the performance of the high-temperature aging treatment could be suppressed by adopting a configuration in which the positive electrode active material layers are not provided on the outermost periphery of the positive electrode of the wound electrode body.

[Reduction of Amount of Oxygen in Battery Case]

(Sample 4)

In manufacturing the battery according to the aforementioned sample 1, the non-aqueous electrolytic solution was injected while being purged by nitrogen gas. A lithium secondary battery (sample 4) was structured with other configurational details made the same as in sample 1. That is, in the lithium secondary battery according to sample 4, when the electrolytic solution was injected, the interior of the battery case was depressurized to about −90 kPa through the liquid injection nozzle, while a liquid injection nozzle capable of sealing the liquid injection port was pressed against the liquid injection port. After that, nitrogen gas was injected into the battery case together with the electrolytic solution. Within 10 seconds after the completion of injection of a predetermined amount (35 mL) of the electrolytic solution, the sealing lid was attached to the liquid injection port through laser welding. 10 cells of this lithium secondary battery for evaluation according to sample 4 were made available.

(Sample 5)

In injecting the electrolytic solution according to the aforementioned sample 4, purge was carried using argon gas instead of nitrogen gas. A lithium secondary battery (sample 5) was structured with other configurational details made the same as in sample 4. In this case as well, 10 cells of this lithium secondary battery for evaluation according to sample 5 were made available.

(Sample 6)

In injecting the electrolytic solution according to the aforementioned sample 4, purge was carried out using helium gas instead of nitrogen gas. A lithium secondary battery (sample 6) was structured with other configurational details made the same as in sample 4. In this case as well, 10 cells of this lithium secondary battery for evaluation according to sample 6 were made available.

(Sample 7)

In injecting the electrolytic solution according to the aforementioned sample 4, purge was carried out using dry air instead of nitrogen gas. A lithium secondary battery (sample 7) was structured with other configurational details made the same as in sample 4. In this case as well, 10 cells of this lithium secondary battery for evaluation according to sample 7 were made available.

[Measurement of Amount of Oxygen in Battery]

The lithium secondary batteries for evaluation according to samples 4 to 7 structured as described above were left at rest for about 20 hours after the injection of the electrolytic solution, and the wound electrode body was impregnated with the electrolytic solution. After that, the respective batteries were put into polyethylene bags, and were depressurized to remove air in the bags. After that, 50 mL of argon was injected into the bags, which were then tightly closed. The safety valve of the battery case was opened in these tightly closed bags. After the bags were left at rest for an hour, the contents of oxygen contained in the gas in these bags were measured. The oxygen contents were measured by collecting 0.1 mL of gas from the gas in the polyethylene bags through the use of a syringe and subjecting this collected gas to a GC-MS analysis. Besides, an oxygen content $V_{ox}$ (mL) was calculated after calculation of an oxygen ratio A (volume %) in 0.1 mL of sample gas from an analysis result, and from an in-battery space volume $V_{cell}$ (mL) obtained in advance, on the basis of an equation (1) shown below. Oxygen contents that were obtained as to the respective batteries were regarded as averages per 10 cells, and were shown in Table 2 below.

$$V_{ox}=(V_{cell}+50)\times A \qquad (1)$$

[Conditioning]

The lithium secondary batteries for evaluation according to samples 4 to 7 structured as described above were charged at a constant current (CC charge) such that the voltage value (the voltage value between the positive and negative electrode terminals) would become equal to 4.1 V at a charge rate of 1C, then discharged at a constant current (CC discharge) to 3.92 V, and charged again at a constant current and a constant voltage (CCCV charge) to 3.97 V, under a temperature condition of a room temperature (25° C.). As a result, a 3.97 charged battery was made available.

[Aging]

The respective lithium secondary batteries that had been subjected to conditioning were retained for 20 hours under a high-temperature condition of 80° C., and were thereby subjected to the aging treatment.

[Self-Discharge Inspection]

After the aforementioned aging treatment, the voltage of the respective batteries upon the lapse of 5 hours at the room temperature (25° C.) was set as an initial voltage ($V_{ini}$). Furthermore, the battery voltage after the preservation for 72 hours at 25° C. was set as a measured voltage ($V_{72h}$). A value that was obtained by subtracting $V_{ini}$ from $V_{72h}$, namely, ($V_{72h}-V_{ini}$) was set as a self-discharge amount ($V_{SD}$). In general, there is established a relationship: $V_{SD}<2$ mV in normal batteries. On the other hand, the value of $V_{SD}$ is high in each cell in which minor short-circuiting has occurred. In this embodiment of the invention, each cell with $V_{SD}$ higher than 5 mV was defined as a minor short-circuiting cell. As for the respective 10 cells of the lithium secondary batteries according to samples 4 to 7, the number of those cells in which this self-discharge amount ($V_{SD}$) was larger than 5 mV was counted, and shown in Table 2.

[Visual Inspection of Scrapping]

The respective lithium secondary batteries that had been subjected to the aforementioned self-discharge inspection were carefully scrapped in a glove box, and the conditions of the electrode bodies were observed. As for those batteries in which Mn components were eluted from the positive electrode active material, discoloration was confirmed on the negative electrode and the separators, so that the presence or absence of this discoloration was visually confirmed. As for the respective lithium secondary batteries according to samples 4 to 7, the number of those batteries in which the elution of Mn was confirmed was counted, and shown in Table 2.

TABLE 2

| Sample | Purge Gas | Oxygen Amount (mL) | $V_{SD}$ > 5 mV (Quantity/ Quantity) | Elution of Mn (Quantity/ Quantity) |
| --- | --- | --- | --- | --- |
| 4 | Nitrogen | 0.6 | 0/10 | 0/10 |
| 5 | Argon | 3.5 | 0/10 | 0/10 |
| 6 | Helium | 1.6 | 0/10 | 0/10 |
| 7 | Dry Air | 4.8 | 8/10 | 10/10 |

In the lithium secondary battery according to sample 7 in which the interior of the battery case was purged by air, about 4.8 mL of oxygen is contained in the battery case. In the self-discharge inspection after the high-temperature aging treatment, the self-discharge amount $V_{SD}$ of 80% of the cells exceeded 5 mV. That is, it could be confirmed that self-discharge occurred acutely. On the other hand, as to the lithium secondary batteries according to samples 4 to 6 in which the interior of the battery case was purged by inactive gas, about 0.6 to 1.6 mL of oxygen was contained in the battery case. However, the self-discharge amount of all the cells of all the batteries after the high-temperature aging treatment was equal to or smaller than 1.5 mV, and self-discharge was suppressed. Besides, in the scrapping visual inspection, as to all the cells of the lithium secondary battery according to sample 7, discoloration of the negative electrode and the separators was confirmed. That is, as to the two cells in which the self-discharge amount $V_{SD}$ was equal to or smaller than 5 mV as well, elution of Mn from the positive electrode and precipitation of Mn onto the negative electrode and the separators were confirmed. As a result, it was revealed that the elution and precipitation of Mn components had occurred although this amount of elution was small. On the other hand, as to the lithium secondary batteries according to samples 4 to 6, discoloration of the negative electrode and the separators was not confirmed as to all the cells. As a result, it was revealed that the elution itself of Mn from the positive electrode was very well suppressed. That is, it could be confirmed that the elution of metal components from the positive electrode active material during the performance of the high-temperature aging treatment could be suppressed by setting the amount of oxygen in the battery case to a range of about 0.2 to 2 mL instead of zero. Although the invention has been described referring to the preferred embodiment thereof, this description is not a restrictive item, and as a matter of course, various modifications are possible.

The invention claimed is:

1. A method of manufacturing a non-aqueous electrolyte secondary battery that is equipped with a wound electrode body that is formed by laminating a positive electrode, which has positive electrode active material layers provided on both faces of a positive electrode current collector thereof respectively, and a negative electrode, which has negative electrode active material layers provided on both faces of a negative electrode current collector thereof respectively, on each other via a separator, and winding a lamination of the positive electrode, the negative electrode, and the separator, the method comprising:

preparing the wound electrode body in which an uncoated portion where the positive electrode active material layers are not formed is laminated in a state of protruding from the negative electrode at one of both ends of the wound electrode body in a direction of a winding axis thereof, an uncoated portion where the negative electrode active material layers are not formed is laminated in a state of protruding from the positive electrode at the other of both the ends of the wound electrode body in the direction of the winding axis thereof, and the positive electrode active material layers are not formed on at least a surface of the positive electrode current collector on a winding outer peripheral side thereof in a region that includes at least an outermost periphery of the positive electrode;

structuring the secondary battery by accommodating the wound electrode body as well as a non-aqueous electrolyte in a battery case; and subjecting the secondary battery to an aging treatment in which the secondary battery is retained within a temperature range that is equal to or higher than 70° C. and equal to or lower than 85° C., wherein the prepared wound electrode body is configured such that the positive electrode active material layers are not formed on both faces of the positive electrode current collector in the region that includes at least the outermost periphery of the positive electrode in the direction of the winding axis and a length of the region that the positive electrode active material layers are not formed, in a winding direction, is equal to or greater than an outer circumference of the wound electrode body in the winding direction, and wherein the prepared wound electrode body is configured such that the region that includes at least the outermost periphery of the positive electrode is arranged on a winding outer peripheral side of a region that constitutes an outermost periphery of the negative electrode wherein an amount of oxygen is about 1 to 8 volume % in a space in the battery case.

2. The method of manufacturing the non-aqueous electrolyte secondary battery according to claim 1, wherein the battery case is equipped with a positive electrode current collector terminal plate that is electrically connected to the positive electrode of the wound electrode body, and a negative electrode current collector terminal plate that is electrically connected to the negative electrode of the wound electrode body, and structuring of the secondary battery includes bundling the uncoated portion of the positive electrode of the wound electrode body in at least a region of the wound electrode body in a circumferential direction thereof, connecting the uncoated portion of the positive electrode to the positive electrode current collector terminal plate in the bundled region without intervention of another member, bundling the uncoated portion of the negative electrode of the wound electrode body in at least a region of the wound electrode body in a circumferential direction thereof, and connecting the uncoated portion of the negative electrode to the negative electrode current collector terminal plate in the bundled region without intervention of another member.

3. The method of manufacturing the non-aqueous electrolyte secondary battery according to claim 1, wherein
each of the positive electrode active material layers includes a lithium transition metal compound oxide including manganese, as a positive electrode active material.

4. The method of manufacturing the non-aqueous electrolyte secondary battery according to claim 1, further comprising subjecting the structured secondary battery to a conditioning treatment, wherein
the aging treatment is performed for the secondary battery that has been subjected to the conditioning treatment.

5. The method of manufacturing the non-aqueous electrolyte secondary battery according to claim 1, wherein
the aging treatment is performed after a battery voltage of the secondary battery is adjusted to a voltage that is equal to or higher than 3.8 V.

6. The method of manufacturing the non-aqueous electrolyte secondary battery according to claim 5, wherein
the aging treatment is performed after a battery voltage of the secondary battery is adjusted to a voltage that is equal to or higher than 3.8 V and the secondary battery is retained for a predetermined time while keeping a charge state.

7. The method of manufacturing the non-aqueous electrolyte secondary battery according to claim 1, wherein
the aging treatment is performed after a battery voltage of the secondary battery is adjusted to a voltage that is equal to or higher than 3.9 V.

8. The method of manufacturing the non-aqueous electrolyte secondary battery according to claim 7, wherein
the aging treatment is performed after a battery voltage of the secondary battery is adjusted to a voltage that is equal to or higher than 3.9 V and the secondary battery is retained for a predetermined time while keeping a charge state.

9. The method of manufacturing the non-aqueous electrolyte secondary battery according to claim 1, wherein the amount of oxygen in the battery case is 0.2 to 2 mL.

10. The method of manufacturing the non-aqueous electrolyte secondary battery according to claim 1, further comprising purging the interior of the battery case by the inactive gas at any stage from the injection of the non-aqueous electrolyte to the sealing of the liquid injection port.

11. The method of manufacturing the non-aqueous electrolyte secondary battery according to claim 1, wherein, when the non-aqueous electrolyte is injected into the battery case, a liquid injection nozzle that is configured to seal the liquid injection port is pressed against the liquid injection port, and an interior of the battery case is depressurized to −90 kPa through the liquid injection nozzle, and inactive gas is injected from the liquid injection port into the battery case together with the non-aqueous electrolyte, and upon completion of injecting the non-aqueous electrolyte, removing the liquid injection nozzle, and attaching a sealing lid to the liquid injection port.

* * * * *